US007665298B2

(12) United States Patent
Di Saverio

(10) Patent No.: US 7,665,298 B2
(45) Date of Patent: Feb. 23, 2010

(54) LOW VOLTAGE HYDRAULIC SYSTEM WITH ELECTRONIC CONTROL FOR MOVING AUTOMATIC CLOSING APPARATUSES

(75) Inventor: Fabrizio Di Saverio, San Nicolo' a Tordino (TE) (IT)

(73) Assignee: Findisa S.r.l., San Nicolo' a Tordino (TE) (IT)

( * ) Notice: Subject to any disclaimer, the term of this patent is extended or adjusted under 35 U.S.C. 154(b) by 241 days.

(21) Appl. No.: 11/747,424

(22) Filed: May 11, 2007

(65) Prior Publication Data

US 2007/0266848 A1 Nov. 22, 2007

(30) Foreign Application Priority Data

May 17, 2006 (IT) ........................ RM20060085 U

(51) Int. Cl.
*F15B 13/01* (2006.01)
*F16D 31/00* (2006.01)

(52) U.S. Cl. ................................................ 60/328; 91/1

(58) Field of Classification Search ................... 60/328; 91/1; 92/5 R
See application file for complete search history.

(56) References Cited

U.S. PATENT DOCUMENTS

| | | | | |
|---|---|---|---|---|
| 2,790,340 | A * | 4/1957 | Cross | 60/328 |
| 4,296,570 | A * | 10/1981 | Balbach et al. | 60/476 |
| 4,726,282 | A * | 2/1988 | LaBair | 92/5 R |
| 4,762,304 | A * | 8/1988 | Hill | 254/93 R |
| 5,035,082 | A * | 7/1991 | Butler | 49/334 |
| 5,161,957 | A * | 11/1992 | Ribaudo | 417/291 |
| 5,373,664 | A * | 12/1994 | Butler | 49/358 |
| 5,417,011 | A * | 5/1995 | Keszthelyi | 49/334 |
| 6,425,820 | B1 * | 7/2002 | Kennedy et al. | 454/169 |
| 6,978,609 | B2 * | 12/2005 | Busch | 60/460 |
| 2003/0213092 | A1 * | 11/2003 | Fischbach et al. | 16/52 |

* cited by examiner

*Primary Examiner*—Thomas E Lazo
(74) *Attorney, Agent, or Firm*—Stanislaus Aksman, Esq.; Roberts Mlotkowski Safran & Cole P.C.

(57) ABSTRACT

The invention concerns a hydraulic system for moving automatic closing apparatuses, comprising hydraulic actuating means capable to move at least one movable member coupled to at least one closing apparatus, wherein said hydraulic actuating means is operated by at least one low voltage dc motor. Preferably, the electronic unit controls, through an encoder and microswitches, the position of a piston or a rotating shaft that operates the automatic closing apparatus during closing and opening phase, favouring an automatic learning of operation times.

16 Claims, 2 Drawing Sheets

LOW VOLTAGE HYDRAULIC SYSTEM WITH ELECTRONIC CONTROL FOR MOVING AUTOMATIC CLOSING APPARATUSES

CROSS-REFERENCE TO RELATED APPLICATIONS

The present Application claims priority from Italian Application No. RM2006A000085 filed on May 17, 2006, which is hereby incorporated by reference in its entirety into the present Application.

FIELD OF THE INVENTION

The present invention relates to a hydraulic system with electronic control for moving automatic closing apparatuses, such as gates or doors, barriers for the passage of vehicles and/or pedestrians, that is simple, reliable, safe, inexpensive, and easy to install.

BACKGROUND OF THE INVENTION

In the following of the description, explicit reference will be mainly made to the case where the automatic closing apparatuses are swing-gates or swing-doors. However, it should be understood that the present invention is not limited to such type of closing apparatuses, being capable to be applied also to other automatic closing apparatuses for delimiting rooms and spaces, such as traffic bollards and underground rotating actuators for gates (for which in the following some embodiments of the system according to the invention will be illustrated), as well as sliding barriers, gates or doors, sectional doors for garages, still remaining within the scope of the present invention.

Presently, systems for moving automatic closing apparatuses comprise hydraulic actuators with high voltage (220 V) electric motors.

Such systems suffer from some drawbacks.

First of all, use of high voltage motors entails a more complex implementation of the systems in order to allow high safety for users and operators during installation and maintenance phases.

Moreover, the force applied to the gate is adjustable only at mechanical level through pressure calibration valves mounted on the distributor or directional valve after a pump moving a movable member of the actuator.

Still, gate movement speed is only adjustable through the use of pumps having different capacity, the characteristics of which have to be already defined at the production phase, therefore making such systems not much versatile.

Furthermore, sensitivity of such systems in case of impact of the gate on an object crossing the passage during its movement is absolutely not controllable unless sophisticated external devices, such as wings sensorised through sensitive edges or obstacle detectors, are used, which are complex and expensive also with regard to their installation.

SUMMARY OF THE INVENTION

It is therefore an object of the present invention to provide a system for moving automatic closing apparatuses, such as gates, doors, or barriers, that is simple, reliable, safe, inexpensive, and easy to install.

It is specific subject matter of this invention a hydraulic system for moving automatic closing apparatuses, comprising hydraulic actuating means capable to move at least one movable member coupled to at least one closing apparatus, characterised in that said hydraulic actuating means is operated by at least one low voltage dc motor.

Always according to the invention, said at least one low voltage dc motor may operate at 12 V or 24 V.

Still according to the invention, the system may further comprise detecting, preferably electronic and/or magnetic, means for detecting the position of said at least one movable member.

Furthermore according to the invention, said hydraulic actuating means may be capable to linearly move said at least one movable member, making it translate.

Always according to the invention, said detecting means may comprise one or more electronic switches each one of which is capable to detect a corresponding linear position of said at least one movable member.

Still according to the invention, said at least one movable member may be a piston.

Furthermore according to the invention, said one or more electronic switches may be capable to interact with a cursor member of a rod integrally coupled to the piston.

Always according to the invention, said hydraulic actuating means may be capable to angularly move said at least one movable member, making it rotate.

Still according to the invention, said detecting means may be capable to detect the angular position of said at least one movable member.

Furthermore according to the invention, said at least one movable member may be a rotating shaft.

Always according to the invention, said detecting means may comprise a magnetic encoder, provided with a rotating disc, coupled to the shaft of said at least one motor, and with a detection unit.

Still according to the invention, the system may further comprise an electronic unit controlling said at least one motor.

Furthermore according to the invention, the electronic unit may control said at least one motor on the basis of one or more signals which it receives from said detecting means.

Always according to the invention, the electronic unit may be connected to an input/output interface unit.

Still according to the invention, the interface unit may be connected to at least one button, the electronic unit learning one or more movement parameters of said at least one closing apparatus on the basis of at least one signal received from said at least one button.

Furthermore according to the invention, said hydraulic actuating means may comprise a pump capable to move, through a distributor or directional valve for switching an oil flow, said at least one movable member.

Always according to the invention, the system may further comprise means for recognizing, preferably amperometrically, an obstacle.

Still according to the invention, the system may further comprise battery and/or solar panel power supply means.

BRIEF DESCRIPTION OF THE DRAWINGS

The present invention will be now described, by way of illustration and not by way of limitation, according to its preferred embodiments, by particularly referring to the Figures of the enclosed drawings, in which.

In the following of the description same reference numbers will be used for indicating alike elements in the Figures.

DETAILED DESCRIPTION

Figure 1:
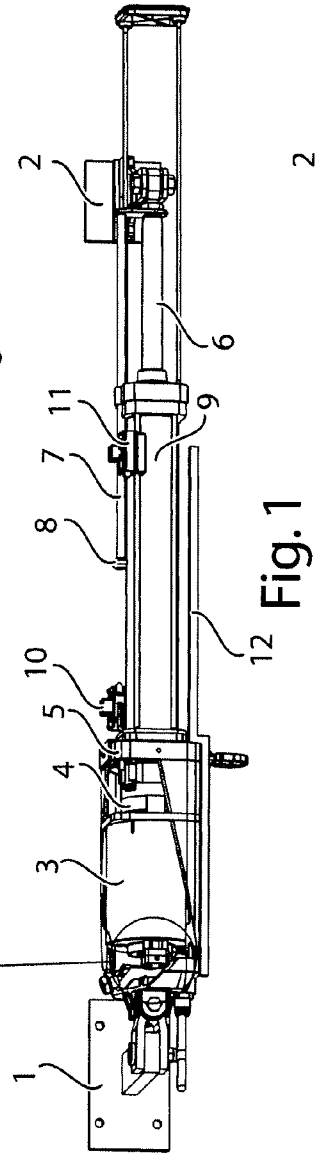
FIG. 1 shows a schematic perspective view of a portion of a first embodiment of the system according to the invention.
Figure 2:
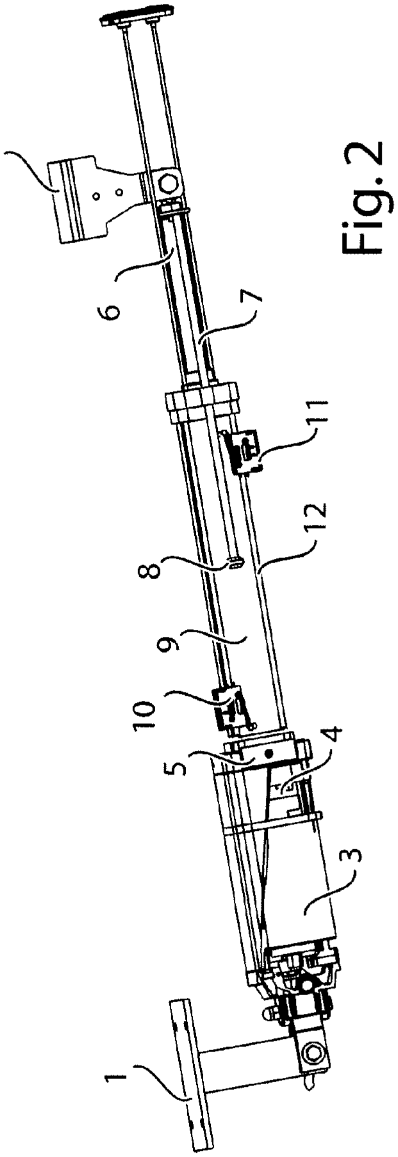
FIG. 2 shows a top view of the system of FIG. 1.

With reference to FIGS. 1 and 2, it may be observed that a first embodiment of the system according to the invention comprises a linear hydraulic actuator applied to a swing-gate (not shown), to which it is conventionally coupled through two plates 1 and 2. In particular, the plate 1 is coupled to the fixed frame of the gate (or to the fixed structure, such as a wall, in which the gate is inserted), whereas the plate 2 is coupled to the wing.

The actuator comprises a low voltage (preferably 12 V or 24 V) dc motor 3 controlling a pump 4. The pump 4, through a distributor or directional valve 5 for switching the oil flow, linearly moves a piston 6, the distal end of which (that is external to a cylinder 9 wherein the other end of the piston 6 slides) is integrally coupled, through the plate 2, to the gate wing. A rod 7 is integrally coupled to the distal end of the piston 6, whereby it is linearly moved with respect to the pump 4 by the movement of the same piston 6.

The motor 3, the pump 4, the distributor 5 and the cylinder 9 for sliding the piston 6 are integrally coupled to each other and hinged on the first plate 1, whereby the linear movement of the piston 6, coupled to the second plate 2, causes the wing to which the latter is attached to open or close.

The proximal end (that is the one closest to the pump 4) of the rod 7, the position of which with respect to the pump 4 depends on the movement of the piston 6, is provided with a cursor 8 capable to interact with a first switch 10, when the position of the cursor 8 corresponds to the complete opening of the gate wing, and with a second switch 11, when the position of the cursor 8 corresponds to the complete closing of the gate wing. In particular, when the cursor 8 interacts with one out of the two switches 10 and 11, a corresponding signal is forwarded through cables 12 to a control electronic unit (not shown in FIGS. 1 and 2) that stops the motor 3 and, consequently, the pump 4.

Figure 3:
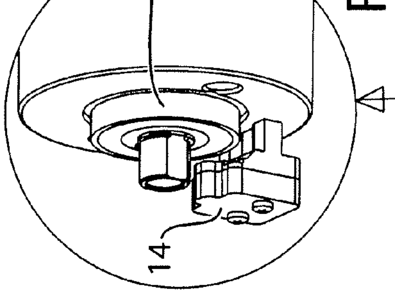
FIG. 3 shows a perspective view of a particular of the system of FIG. 1.

With reference to FIG. 3, it may be observed that the system of FIGS. 1 and 2 is further provided with a detector for detecting the position of piston 6 (and, consequently, of rod 7 and cursor 8) which detector is made through a magnetic encoder comprising a rotating disc 13 of ferrous material, integral with the shaft of the motor 3, and a detection unit 14, measuring the variation of a flow generated by a permanent magnet and sending to the control electronic unit a corresponding signal depending on the detected variations of magnetic field, i.e. on the angular position of the motor and, consequently, the position of the piston 6.

Figure 4:
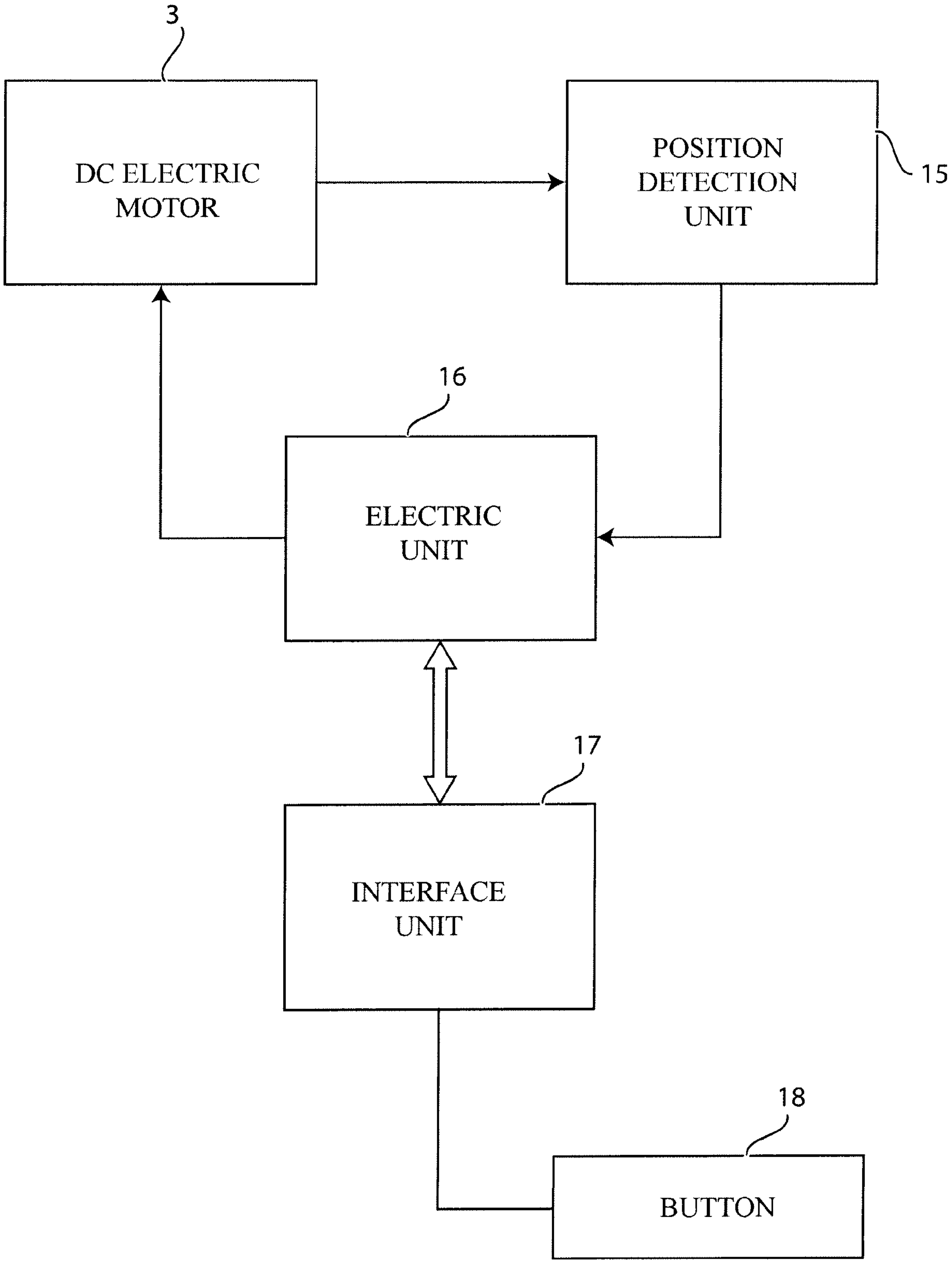
FIG. 4 shows a schematic block diagram of the system of FIG. 1.

With reference to FIG. 4, it may be observed that the electronic architecture of the system of FIGS. 1 and 2 comprises the control electronic unit 16, that controls the motor 3 of the system hydraulic actuator, and that receives the signals coming from a unit 15 for detecting the position of the piston 6 (depending on the rotation of the motor 3). Such detection unit 15 comprises the switches 10 and 11 and the magnetic encoder 13-14.

Unit 16 is further connected to an input/output interface unit 16, through which system operation data may be read, thus detecting for instance possible malfunctions, and through which system operation parameters may be updated.

In particular, through a button 18, operatable by an installer, that is connected to such interface unit 17, it is possible to carry out in an automatic manner stroke and time learning through the control unit 16, as it already usually occurs in low voltage electromechanical actuators. In fact, the magnetic encoder (or, alternatively, a plurality of limit switches, of the same type as switches 10 and 11, distributed along the path of the cursor 8) allows the control unit 16 to know the position of the gate wing during its movement, and in particular when the latter reaches a final beat (either when opening or closing), thus favouring a substantially automatic learning of operation times.

Figure 5:
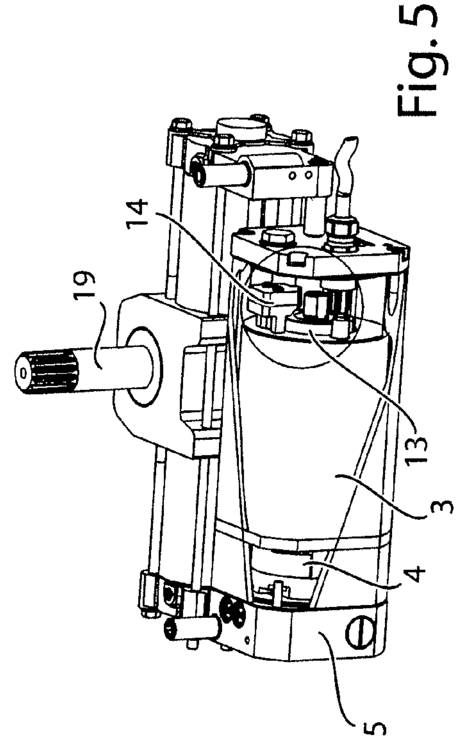
FIG. 5 shows a schematic perspective view of a portion of a second embodiment of the system according to the invention.

FIG. 5 shows a second embodiment of the system according to the invention, applied to an underground rotating actuator, wherein the low voltage (preferably 12 V or 24 V) dc motor 3 is still visible, which motor controls the pump 4 that, through the distributor 5, causes a rotating shaft 19 to rotate, which shaft is connected to the closing apparatus (not shown), e.g. a gate, of which the system controls the movement. The system of FIG. 5 is provided with a detector for detecting the angular position of the shaft 19 that is implemented through a magnetic encoder, comprising a rotating disc 13 and a detection unit 14, that measures the angular position of the motor 3.

Figure 6:
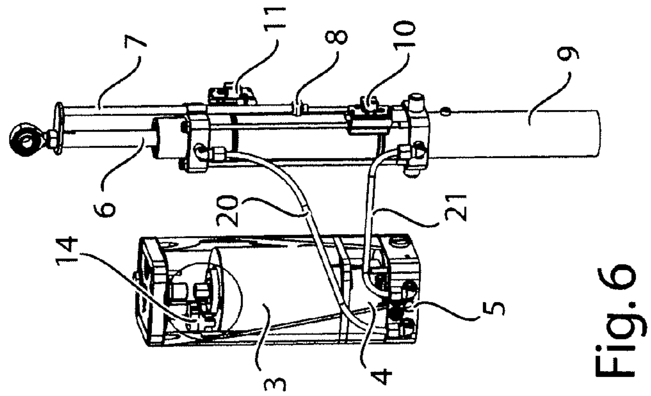
FIG. 6 shows a schematic perspective view of a portion of a third embodiment of the system according to the invention.

FIG. 6 shows a third embodiment of the system according to the invention, applied to a traffic bollard or a barrier, wherein a low voltage (preferably 12 V or 24 V) dc motor 3 is still visible, which motor controls a pump 4 that linearly moves, through a distributor 5 connected through two ducts 20 and 21 to a cylinder 9 within which a piston 6 slides, the same piston 6, to which the traffic bollard (not shown), of which the system controls the movement, is integrally applied. The system of FIG. 6 is provided with both the switches 10 and 11, capable to interact, similarly to the system of FIGS. 1 and 2, with the cursor 8 of a rod 7 integral to the piston 6 for detecting its two limit positions, and a detector for detecting the angular position of the piston 6 implemented through a magnetic encoder, comprising a rotating disc 13 and a detection unit 14, which measures the angular position of the motor 3.

Other embodiments of the system according to the invention may further comprise a conventional device for amperometrically recognizing an obstacle, that possibly causes an impact during closing, which device is controlled by the electronic unit 16.

Still, thanks to the low voltage power supply, further embodiments of the system according to the invention may comprise emergency batteries and/or solar panels for ensuring system operation even in case of lack of energy.

The advantages offered by the system according to the invention are evident.

First of all, besides the fact that it operates at low voltage, the system has no calibration valves on the distributor, and all the parameters of speed, force, decelerations and sensitivity are adjustable at electronic level. In particular, adjustments of speed and sensitivity, nowadays impossible on presently commercialized traditional hydraulic automations, are instead possible in the system according to the invention. This entails a great simplification of the system installation, that does not necessarily require intervention of specialized installers, consequently reducing the related costs.

Also, the system according to the invention more easily allows to meet safety regulations in force without using expensive and complex external devices.

Still, use of electronic and/or magnetic detectors for detecting the position of the automatic closing apparatus, or even only the complete opening and the complete closing thereof, allows, on the one hand, to avoid the use of mechanical beats on the ground, forbidden in some countries such as the US for safety reasons, thus also simplifying system installation, and, on the other hand, to eliminate the classical problem of the hydraulic actuator that prosecutes for some seconds its pushing movement even after having arrived at stop, causing a greater wear and a more frequent maintenance thereof.

The present invention has been described, by way of illustration and not by way of limitation, according to preferred embodiments thereof, but it should be understood that those skilled in the art can make variations and/or changes, without so departing from the related scope of protection, as defined by the enclosed claims.

The invention claimed is:

1. A hydraulic system for moving at least one automatic closing apparatus, comprising hydraulic actuating means capable to move at least one movable member coupled to at least one closing apparatus, wherein said hydraulic actuating means is operated by at least one low voltage dc motor, said hydraulic actuating means being capable to linearly move said at least one movable member to translate said at least one movable member, said system further comprising electronic and/or magnetic detecting means for detecting the position of said at least one movable member, which detecting means comprises a magnetic encoder, provided with a rotating disc, coupled to a shaft of said at least one low voltage dc motor and a detection unit.

2. A hydraulic system according to claim 1, wherein said at least one low voltage dc motor operates at 12 V or 24 V.

3. A hydraulic system according to claim 1, wherein said electronic and/or magnetic detecting means comprises one or more electronic switches, each one of which is capable of detecting a corresponding linear position of said at least one movable member.

4. A hydraulic system according to claim 3, wherein said at least one movable member is a piston.

5. A hydraulic system according to claim 4, wherein said one or more electronic switches are capable to interact with a cursor member of a rod integrally coupled to the piston.

6. A hydraulic system according to claim 1, wherein said hydraulic actuating means is capable to angularly move said at least one movable member to rotate said at least one movable member.

7. A hydraulic system according to claim 6, wherein said electronic and/or magneticdetecting means is capable of detecting the angular position of said at least one movable member.

8. A hydraulic system according to claim 6, wherein said at least one movable member is a rotating shaft.

9. A hydraulic system according to claim 1, the system further comprising an electronic unit controlling said at least one low voltage dc motor.

10. A hydraulic system according to claim 9, wherein the electronic unit controls said at least one low voltage dc motor on the basis of one or more signals which said electronic unit receives from said detecting means.

11. A hydraulic system according to claim 9, wherein the electronic unit is connected to an input/output interface unit.

12. A hydraulic system according to claim 11, wherein the interface unit is connected to at least one button, the electronic unit learning one or more movement parameters of said at least one automatic closing apparatus on the basis of at least one signal received from said at least one button.

13. A hydraulic system according to claim 1, wherein said hydraulic actuating means comprises a pump capable to move, through a distributor or directional valve for switching an oil flow, said at least one movable member.

14. A hydraulic system according to claim 1, the system further comprising means for recognizing an obstacle.

15. A hydraulic system according to claim 1, the system further comprising battery and/or solar panel power supply means.

16. A hydraulic system according to claim 14, wherein the means for recognizing the obstacle comprises amperometric means.

* * * * *